United States Patent [19]

Guildford

[11] 4,130,835
[45] Dec. 19, 1978

[54] ELECTRICAL WAVEFORM ANALYSIS

[75] Inventor: Leslie H. Guildford, Haywards Heath, England

[73] Assignee: U.S. Philips Corporation, New York, N.Y.

[21] Appl. No.: 637,777

[22] Filed: Dec. 4, 1975

[30] Foreign Application Priority Data

Dec. 13, 1974 [GB] United Kingdom ............... 54007/74

[51] Int. Cl.² ............................................. H03B 3/04
[52] U.S. Cl. ..................................... 358/160; 358/93; 358/96; 358/108; 358/113
[58] Field of Search ................ 178/DIG. 8, DIG. 34, 178/DIG. 21, DIG. 38, 6, 6.8; 340/258 R; 358/93, 113, 96, 125, 108, 160

[56] References Cited

U.S. PATENT DOCUMENTS

| | | | |
|---|---|---|---|
| 3,812,483 | 5/1974 | Graves | 178/DIG. 8 |
| 3,878,323 | 4/1975 | Fisher | 178/DIG. 21 |
| 3,903,357 | 9/1975 | Woolfson et al. | 178/DIG. 21 |
| 3,943,277 | 3/1976 | Everly et al. | 178/DIG. 21 |
| 3,955,046 | 5/1976 | Ingham et al. | 178/DIG. 21 |

Primary Examiner—Richard Murray
Attorney, Agent, or Firm—Thomas A. Briody; William J. Streeter; Henry I. Steckler

[57] ABSTRACT

A circuit for detecting changes in the amplitude of a video signal features a sampler for sampling the signal. The sampled signal is then held and delayed by a selected amount. The delayed and undelayed signals are then compared and when the difference exceeds a threshold, an output signal is supplied.

6 Claims, 16 Drawing Figures

ELECTRICAL WAVEFORM ANALYSIS

This invention relates to video signal analysis and more particularly to circuit arrangements for detecting changes in amplitude of a video signal.

It is known that the presence of objects in a scene being scanned by a detector, such as an infra-red detector, can be determined by differentiating the incoming video signal derived from the detector and passing the resultant electrical waveform through a threshold circuit. Only relatively sharp transitions in the resultant electrical waveform will appear at the output of the threshold circuit, these sharp transitions being derived from changes in the video signal amplitude due to both small objects and edges of larger objects. However, when such a differentiation process is effected by means of electrical differentiation in an RC-network, a number of disadvantages appear. The worst are the overshoot and changes in the mean level of the resultant electrical waveform being presented to the threshold circuit, due to the limited low frequency response of the RC-network and the prior history of the incoming video signal. Wanted transistions could therefore become obscured and unwanted transistions and noise revealed.

According to the present invention a circuit arrangement for detecting changes in amplitude of a video signal comprises means for deriving delayed samples of the video signal, means for comparing each delayed sample with a real-time sample of the video signal to produce a resultant sample having a parameter indicative of the difference of the amplitudes of the compared samples, and threshold means responsive to a resultant sample the said parameter of which is of a value exceeding that of a threshold value, to produce an output signifying a detected change in amplitude of the video signal.

With a circuit arrangement according to the invention, the aforesaid disadvantages which exist when using an RC-network are avoided.

In order that the invention may be more fully understood reference will now be made, by way of example, to the drawings filed with the Provisional Specification and to the accompanying drawing.

Figure 1:
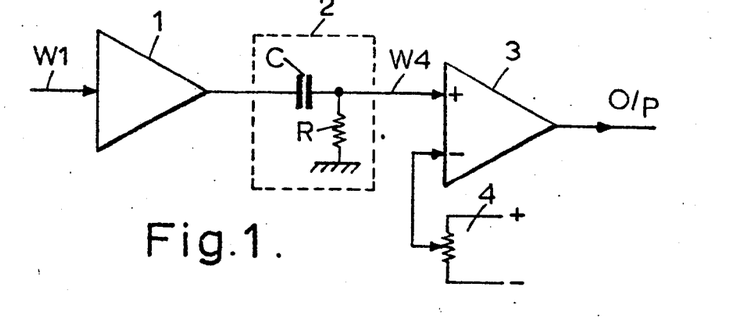
FIG. 1 is a known circuit arrangement for effecting amplitude discrimination of a video signal.

Referring to the drawings, the known circuit arrangement shown in FIG. 1 comprises an amplifier 1 an RC-differentiating network 2, a threshold circuit 3 and a set threshold element 4. An incoming video waveform W1 applied to the amplifier 1 is fed to the RC-network 2 which produces a resultant differentiated waveform W4 which is applied to the threshold circuit 3. The output waveform from the threshold circuit 3 will consist of those transitions in the waveform W4 that are of sufficient amplitude to exceed its threshold setting, as determined by the element 4.

Figure 6:
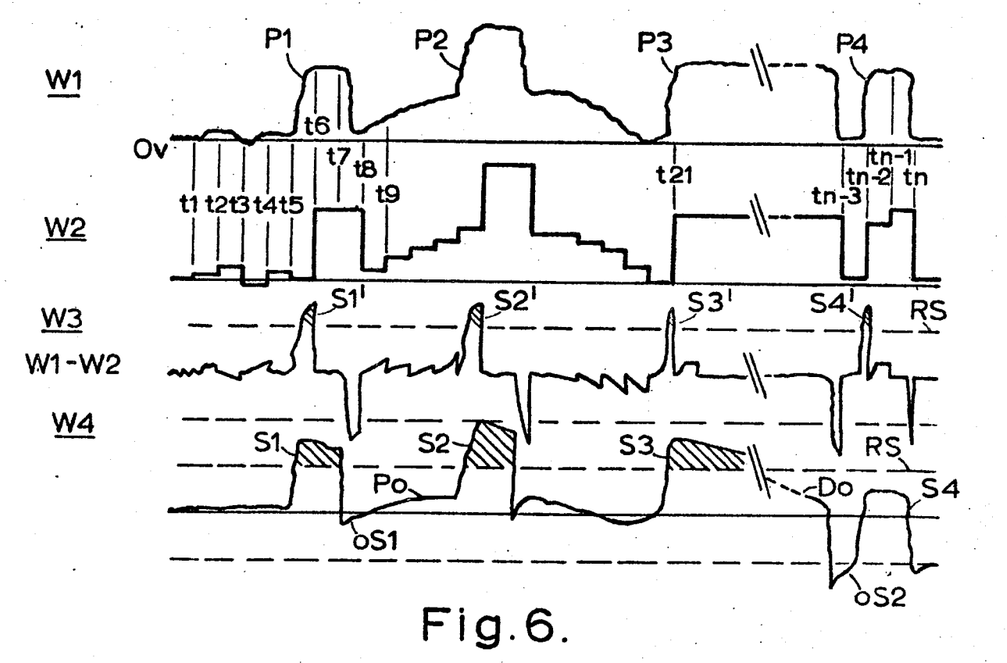
FIG. 6 shows waveform diagrams which are illustrative of the respective operations of the circuit arrangements of FIGS. 1 and 2.

An example of the incoming video waveform W1 is shown in FIG. 6. This waveform has four distinct peaks P1, P2, P3, P4 which are due to objects in a scene being scanned by some form of detector from which the video waveform W1 is produced. The object represented by the peak P1 at times t6 and t7 is distinct and is followed by a second object represented by the peak P2 which is seen against a steadily increasing background. The third object represented by the peak P3 commences at time t21 and is broad. This is immediately followed by a fourth, small, object represented by the peak P4 at time tn-1.

The waveform W4 represents the differentiated video signal which is presented to the threshold circuit 3. This waveform W4 has a first transistion S1 due to the peak P1 in waveform W1. This first transistion S1 exceeds the threshold setting, represented by the dotted line RS, of the set threshold element 4, and is thus detected and will appear at the output of the threshold circuit 3 during the hatched portion of the transistion S1. However, overshoot will occur due to poor low frequency response of the RC-network 2. The harder the differentiation, the worse is the "droop" or overshoot. This overshoot is represented in waveform W4 by the portion OS1. The second object represented by the peak P2 in waveform W1 appears against a steadily increasing background signal which will break through the RC-network 2 and produce a positive offset to the wanted signal from the second object. This positive offset is represented by the portion PO in the waveform W4 and because of it the transistion S2 due to the peak P2 is raised. However, the second object is also detected readily enough by the threshold circuit 3 and will appear at the output thereof during the hatched portion of the transistion S2, but had it been of insufficient amplitude normally to cross the threshold RS an unwanted signal would have been detected in respect of it due to the prior history of the incoming video waveform W1 and the limitations of the RC-network 2. Therefore, it can be seen that "background noise" can be produced in the output from the threshold circuit 3, due to changes in the mean level of the incoming video waveform, with this type of amplitude discriminator. The third object represented by the peak P3 in waveform W1 is broad compared with the first two objects. The threshold circuit 3 will detect the third object during the hatched portion of the transistion S3 until the poor low frequency response of the RC-network 2 makes the waveform W4 droop excessively below the threshold value RS. This droop is represented by the portion DO in the transistion S3 in waveform W4. However, the third object has been detected and this may be all that is required, but the excessive droop results in bad overshoot as indicated by the portion OS2 in waveform W4 so that the peak P4 produces a transistion S4 which does not exceed the threshold RS and thus the fourth object is not detected.

Thus, there are two conflicting limitations to this method of amplitude or edge discrimination, namely, that the differentiation should be as hard as possible within bandwidth limits to detect sharp transistions and limit low frequency breakthrough, and that the low frequency response should be as high as possible in order to prevent droop and overshoot.

A circuit arrangement according to the invention overcomes these limitations by measuring and thresholding the true differential of the transitions in the incoming video waveform. To achieve this, use can be made of a sample and hold circuit to sample and hold the incoming video waveform for a period of time during which comparison is made between the stored sample and a real time sample of the incoming video waveform. The difference between these two samples is then presented by a comparator to a threshold circuit.

Figure 2:
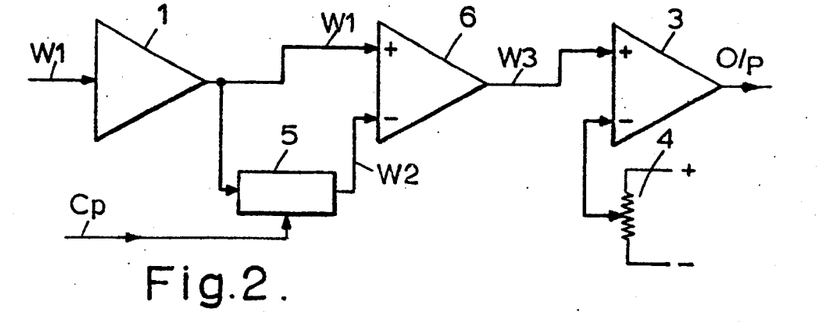
FIG. 2 is a circuit arrangement according to the invention for effecting amplitude discrimination of a video signal.

This simple arrangement according to the invention is shown in FIG. 2 and comprises an amplifier 1, a threshold circuit 3, and set threshold element 4, as in the arrangement of FIG. 1, but in place of an RC-differentiating network the circuit arrangement of FIG. 2 comprises a sample and hold circuit 5 which is driven by sampling clock pulses Cp and a comparator 6. Waveform W2 in FIG. 6 represents the sampled waveform produced by the sample and hold circuit 5 and the waveform W3 represents the output applied from the comparator 6 to the threshold circuit 3, that is an output which represents the differential W1-W2. It can be seen from waveform W3 that there is a transistion (S1' to S4') above the threshold RS for each of the peaks P1 to P4 in the incoming video waveform W1, so that the output from the threshold circuit 3 in this instance signifies the detection of each of the four objects represented by these peaks P1 to P4.

Figure 7:
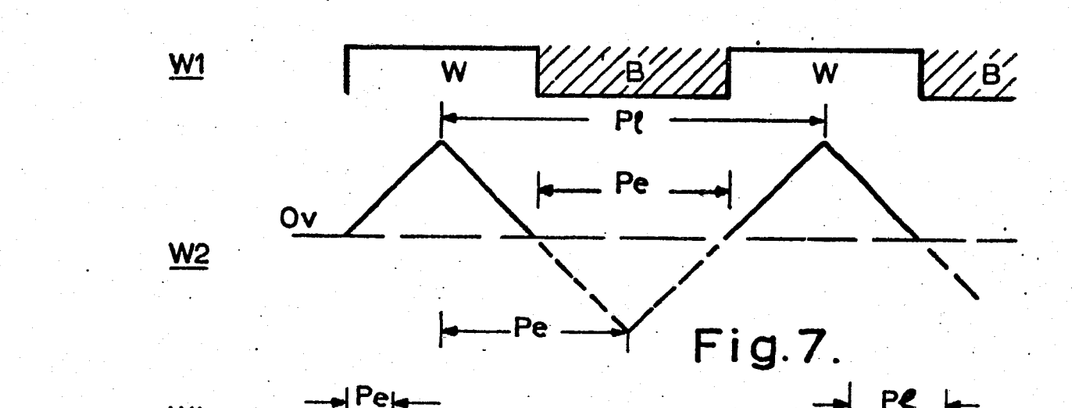
FIGS. 7 to 14 show, respectively, further waveform diagrams which are illustrative of the operation of circuit arrangements according to the invention.
Figure 8:
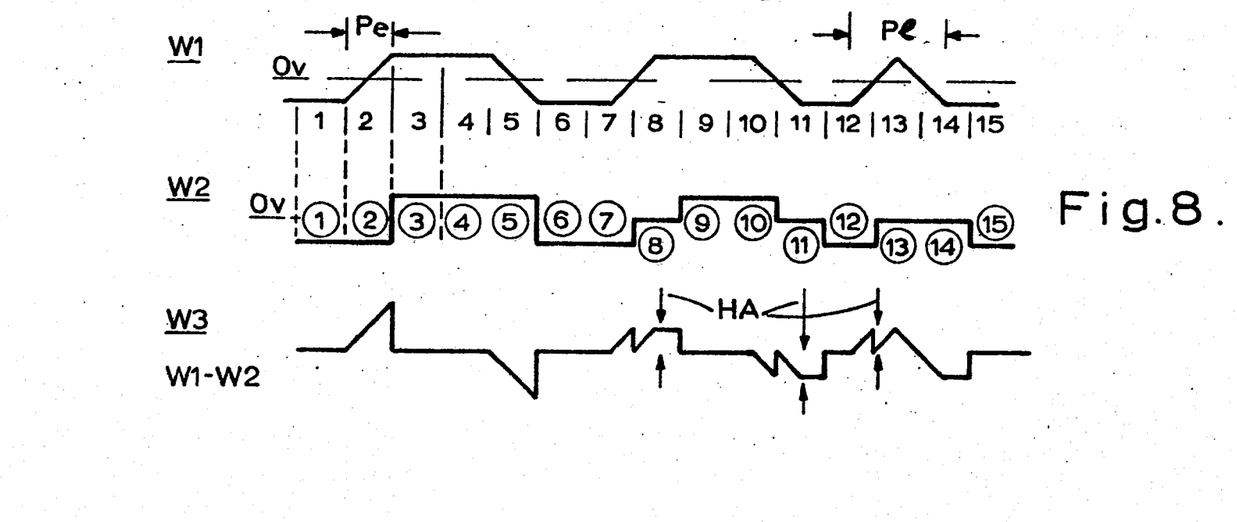

The waveform W1 in FIG. 7 symbolises a picture element pattern having alternate white (W) and black (B) elements. The waveform W2 in FIG. 7 is a triangular waveform which symbolises the bandwidth limits of an incoming video waveform. It can be seen from these waveforms that the maximum differential occurs over a period Pe of one picture element. Hence the differential will be greater when the delay between the held sample and the real time sample is equivalent to one picture element period or one half of the period P1 of the spatial line pair frequency of interest. Ideally, the held sample with which the real time sample is to be compared should be taken at the maxima or minima of the transistions. However, there is no coherence between the incoming video waveform and the sampling clock pulses Cp which drive the sample and hold circuit 5, so that the ideal situation exists only on a statistical basis. Loss of signal amplitude due to phasing errors when using the simple sample and hold arrangement in FIG. 2 is illustrated by waveforms W1, W2 and W3 in FIG. 8. Of these waveforms, W1 symbolises an imcoming video waveform, W2 represents the held waveform, and W3 = (W1 — W2) represents the difference waveform from the comparator 6. From these waveforms, it can be seen that there is a possible loss of up to 50% of the differential signal due to what might be described as "phase noise". This loss is represented by the half-amplitude portions HA of the waveform W3. Thus, by using a free-running sampling clock, a sampling rate equal to the picture element rate, a hold period equal to one picture element period, and a delay at the input of the comparator 6 of waveform W2 equal to the hold time of 0→1 picture element period, the circuit arrangement of FIG. 2 has certain limitations.

Figure 3:
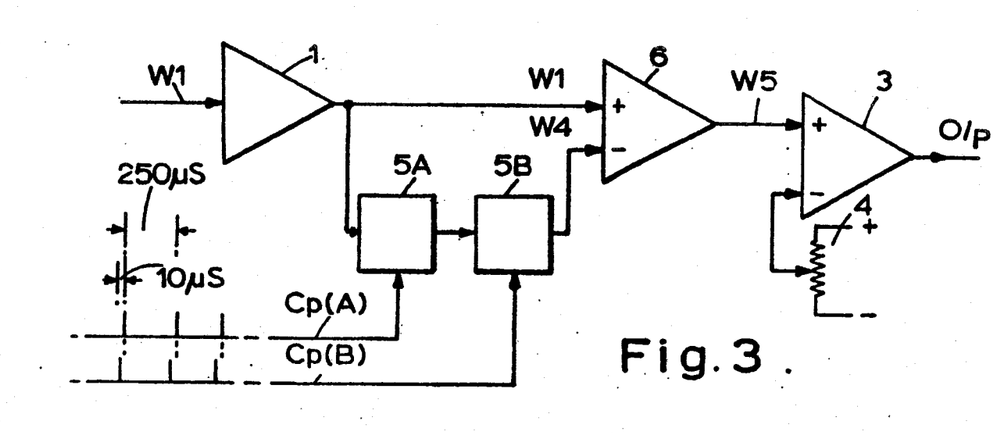
FIGS. 3, 4, 5 and 15 show respective alternative forms of circuit arrangement according to the invention.
Figure 9:
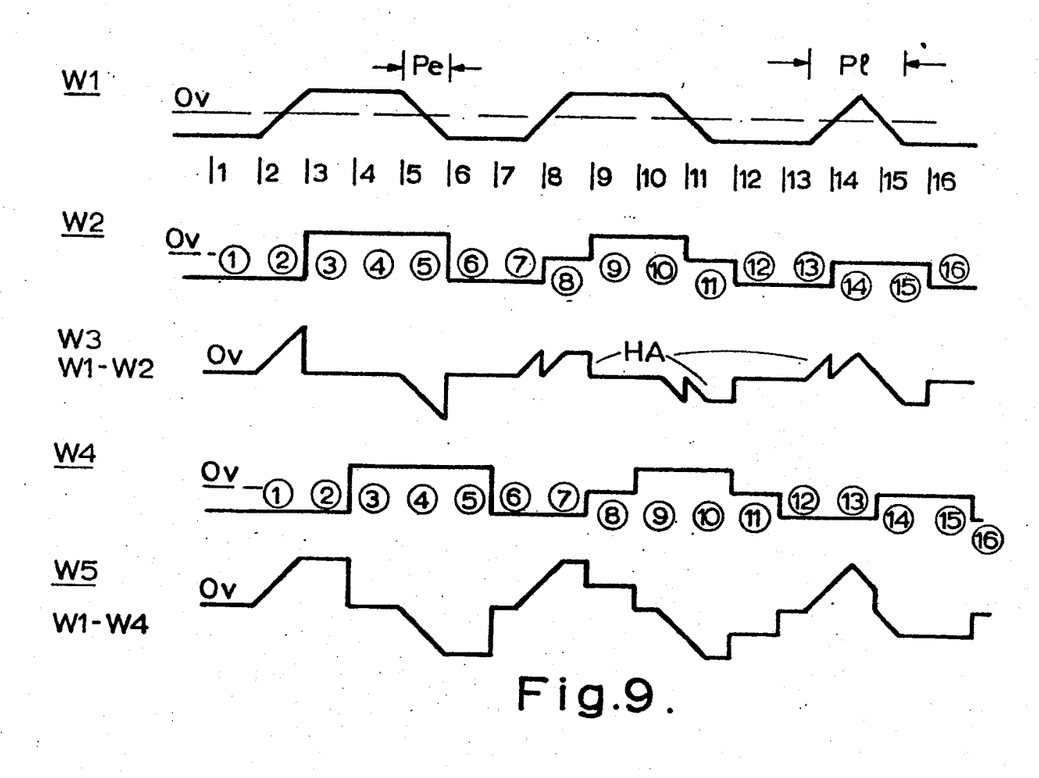
Figure 10:
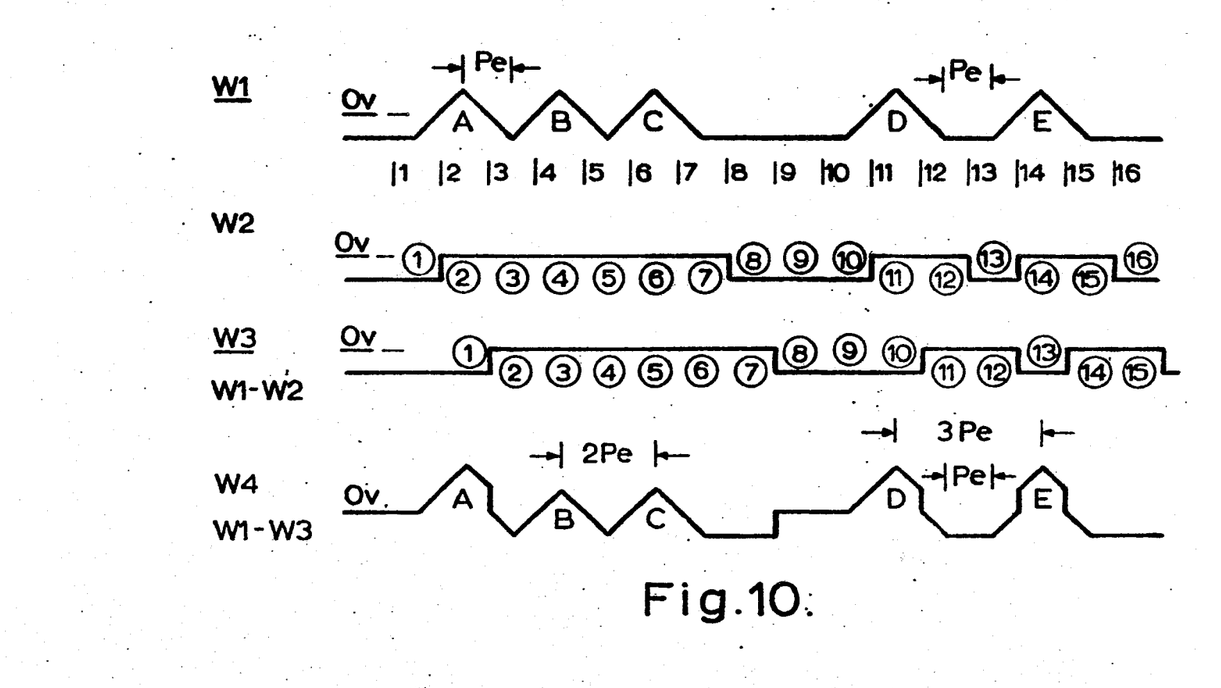

The effects of "phase noise" can be reduced by sampling at the picture element rate and using two sample and hold circuits in tandem to delay the held sample by an additional full picture element period. The circuit arrangement according to the invention shown in FIG. 3 achieves this. The relevant waveforms are shown in FIGS. 9 and 10. The operation of the circuit arrangement of FIG. 3 is as follows. A sample of the incoming video waveform is taken by a sample and hold unit 5A in a fraction of a picture element period, e.g. 10 microseconds or less. This sample is held until the completion of a full picture element period, say 250 micro-seconds total, if the spatial frequency is limited to 2kHz. A sample and hold circuit 5B is clocked at the end of the 250 micro-second hold period and the sample stored in 5A is repeated in 5B. A sample relating to the next full picture element period of the incoming video waveform is then clocked into 5A, after 5B has made its acquisition. Thus the sample in 5B is available to the comparator 6 for one picture element period after the initial delay of one picture element period. For example, it will be available for a period of 250 to 500 micro-seconds after the real time signal appears at the comparator 6.

Waveform W1 in FIG. 9 represents the incoming video waveform, waveform W2 represents the held samples in 5A with a delay of 0→1 picture element period, waveform W3 = W1 — W2 shows what would occur if comparison was made with the output of the first sample and hold circuit 5A when using the full picture element sampling rate, waveform W4 represents the held samples delayed by a full picture element period (i.e. 1→2 picture element periods) at the output of sample and hold circuit 5B, and waveform W5 = W1 — W4 represents the output from the comparator 6. It can be seen that the half amplitude portions HA in waveform W3 do not occur in waveform W5, in which all the positive going transistions have been detected.

Figure 11:
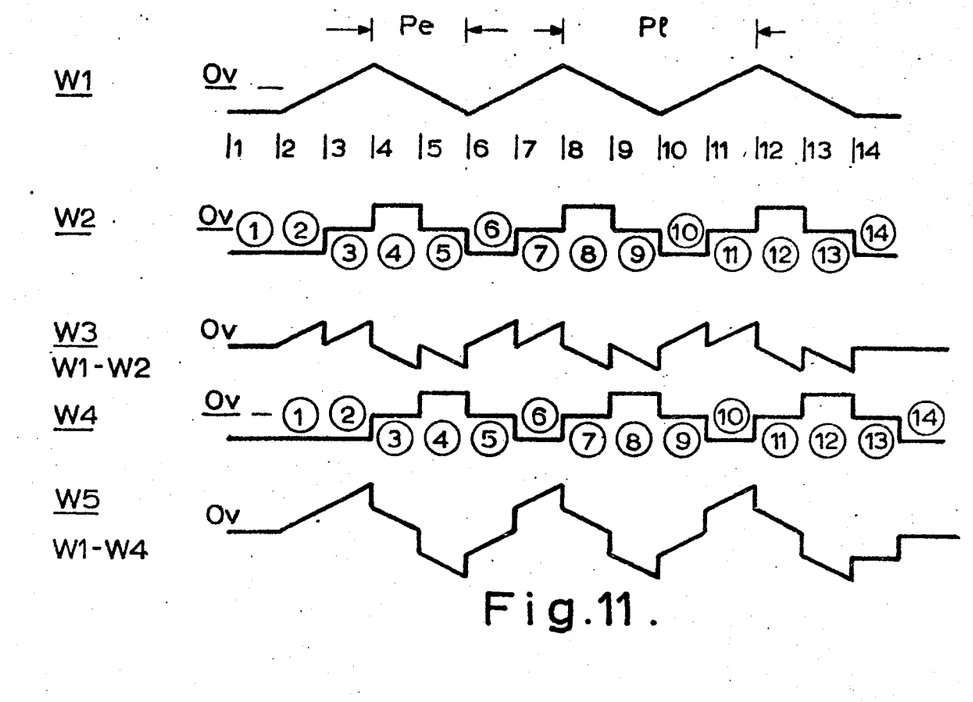

There is, however, a limit on the duration of the transistion in the detection of closely adjacent bandwidth limited signals. Waveforms W1 to W4 in FIG. 10 show particular limiting cases. Waveform W1 represents the incoming video waveform, waveform W2 represents the held samples in 5A, waveform W3 represents the held samples in 5B and waveform W4 represents the output from the comparator 6. The portions A, B and C of waveform W1 simulate a group of objects spaced one picture element part. The comparator output waveform W4 shows that portion A is detected at normal amplitude but portions B and C will produce only half height signals. This would be satisfactory in many instances as it is unlikely that these portions would remain at this particular spatial frequency. Portions D and E in waveform W1 show the limit of resolution and full amplitude is only preserved when trailing or leading edges of transistions, which are either common or associated with subsequent transistions, are spaced by more than one full picture element period. Thus objects will be detected at the limiting bandwidth when they are at least three picture elements apart as shown in waveform W4. The waveforms W1 to W5 in FIG. 11 show the effect of sampling twice per picture element period, and having a delay of one picture element period. Waveform W1 represents the incoming video waveform, waveform W2 represents the samples held in 5A, waveform W3 represents W1 — W2 with the delay of 0→½ picture element period, waveform W4 represents the samples held in 5B, and waveform W5 = W1 — W4, represents the comparator output with the delay ½→1 picture element period.

Figure 4:
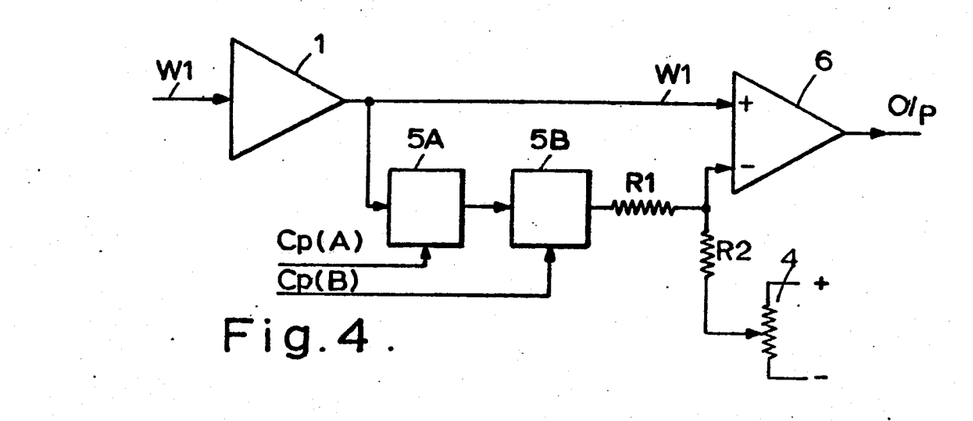

The circuit arrangement shown in FIG. 4 is a simplified arrangement of FIG. 3 and omits the threshold detector 3. Instead the set threshold element 4 and the sample and hold circuit 5B are coupled by means of two resistors R1 and R2 to one input of the comparator 6.

Figure 5:
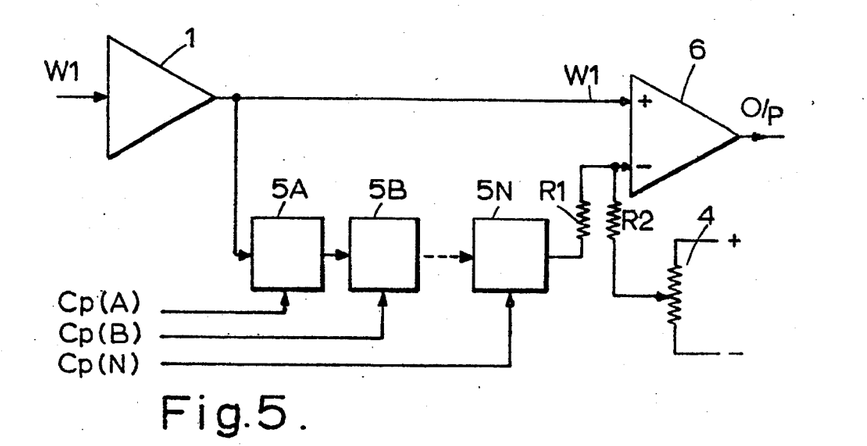

The circuit arrangement shown in FIG. 5 uses multiple sample and hold circuits 5A, 5B-5N. The relevant waveforms W1 to W7 for this circuit arrangement are illustrated in FIGS. 12 to 14.

Figure 12:
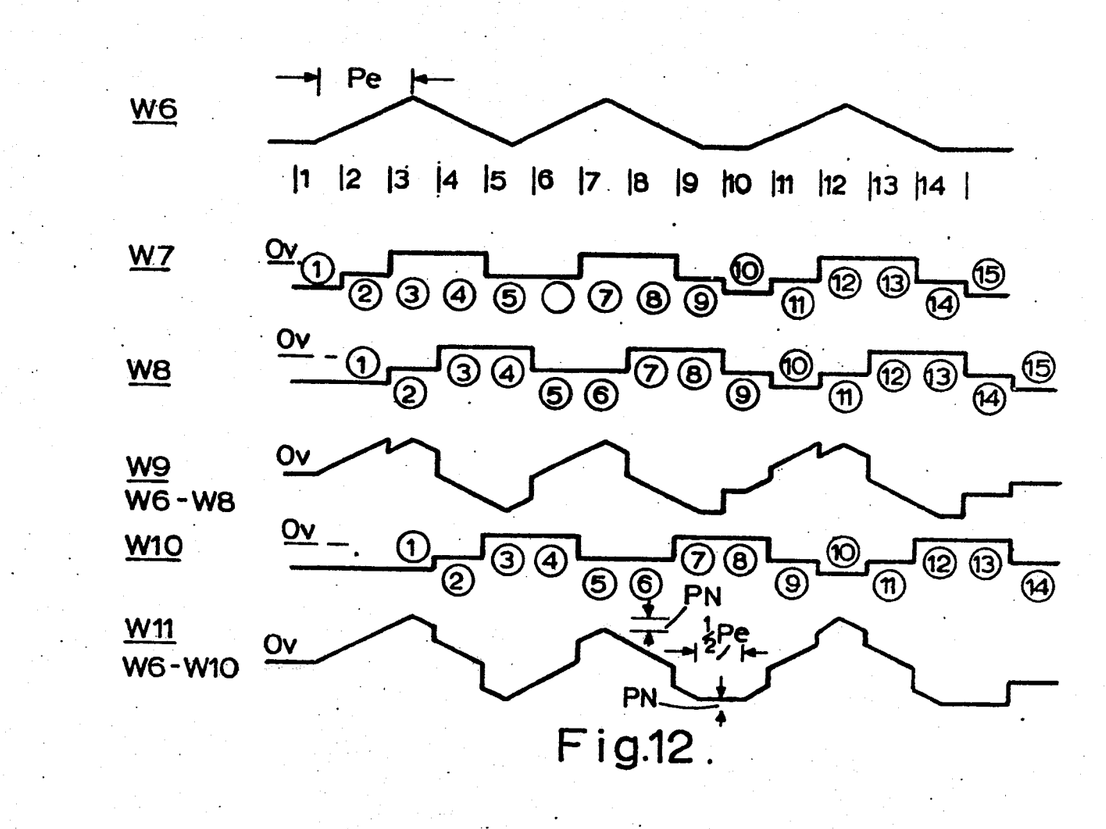

Waveforms W6 to W11 in FIG. 12 show the effect of sampling twice per picture element period, with the incoming video waveform phase shifted by one half a hold period compared with the incoming video waveform W1 in FIG. 11, and using three sample and hold circuits. Waveform W6 represents the incoming video waveform, waveform W7 represents the samples held in 5A, waveform W8 represents the samples held in 5B, waveform W9 represents W6–W8, waveform W10 represents the samples held in 5C, and waveform W11 = W6 − W10 represents the comparator output. The reduction in phase noise PN is shown in waveform W11.

Figure 13:
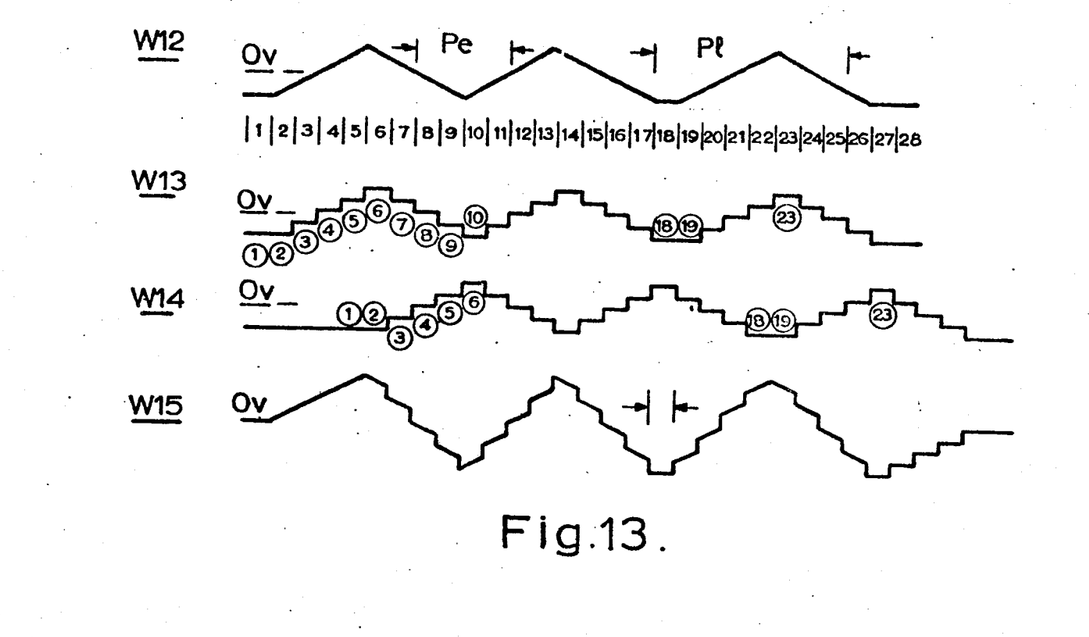

Waveforms W12 to W15 in FIG. 13 show the effect of sampling using a quarter picture element period and five sample and hold circuits. Waveform W12 represents the incoming video waveform, waveform 13 represents the samples held in 5A, waveform W14 represents the samples held in 5E, and waveform W15 = W12 − W14 represents the comparator output with the delay 1→1¼ picture element periods.

Figure 14:
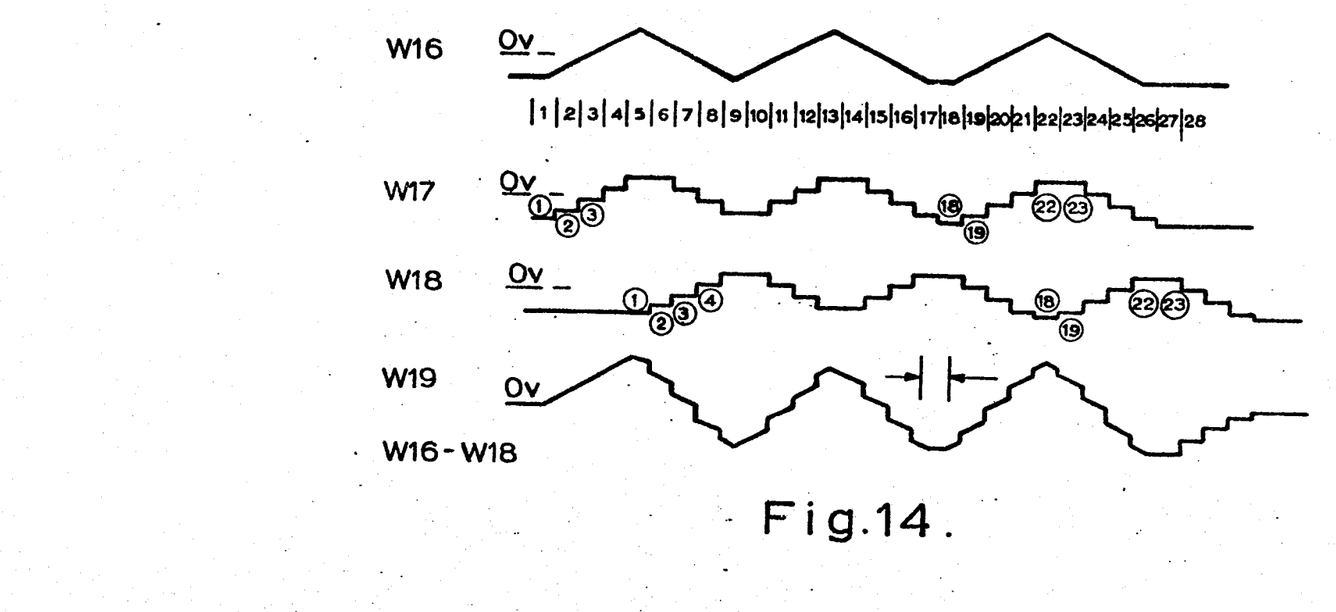

Waveforms W16–W19 in FIG. 14 show the effect of sampling using a quarter picture element period and five sample and hold circuits, with the incoming video waveform W16 shifted in phase by one-eighth a picture element period compared with the incoming video waveform W12 in FIG. 13. Waveform W17 represents the samples held in 5A, waveform W18 represents the samples held in 5E, and W19 = W16 − W18 represents the comparator output with the delay 1→1¼ picture element periods. Thus, the use of a plurality of sample and hold circuits reduces "phase noise". Also, transistions occurring at the limiting frequency may now be detected individually: compare waveform W4 in FIG. 10 with waveform W11 in FIG. 12.

With a circuit arrangement according to the invention the discrimination of transistions in an incoming waveform that occur against more slowly changing signals becomes possible. This applies not only to signals occurring naturally, as picked up by transducers and detectors, but also to signals which have been modified by the response of the arrangement. In particular, the limitations imposed by T.G.S. and other pyro-electric detectors, and poor low frequency response of amplifiers.

In a circuit arrangement according to the invention it becomes possible to use a delay period equivalent to n+1 hold periods, where n is the number of samples taken per picture element period or the number of samples taken in a period equivalent to one half of the period of the limiting bandwidth.

The use of multiple sample and hold circuits enables better discrimination between successive transistions in the incoming video waveform to be obtained. The discrimination without loss of amplitude is given by the time between successive edges, either positive or negative going, which must be in excess of the period of limiting bandwidth, divided by the number of samples per period of limiting bandwidth: or in terms of spatial resolution, the picture element period divided by the number of samples per picture element period.

The circuit arrangements of the invention using multiple sample and hold circuits to produce delays of groups of samples permit by the appropriate selection of these groups discrimination between signals of varying duration and timing and also between transistions having varying slopes (dv/dt), or scenes with varying thermal or visible contours. An arrangement according to the invention can be implemented by either analogue or digital means, or a combination of these techniques. Furthermore, selection of the signal or spatial frequencies can be discriminated by varying the sampling rate. Finally, selection of positive or negative going transistions can be effected by scanning first in the forward then in the reverse direction and using appropriate threshold polarities for example a video line scan left to right then right to left or a recorded waveform played first forward and then in reverse.

Figure 15:
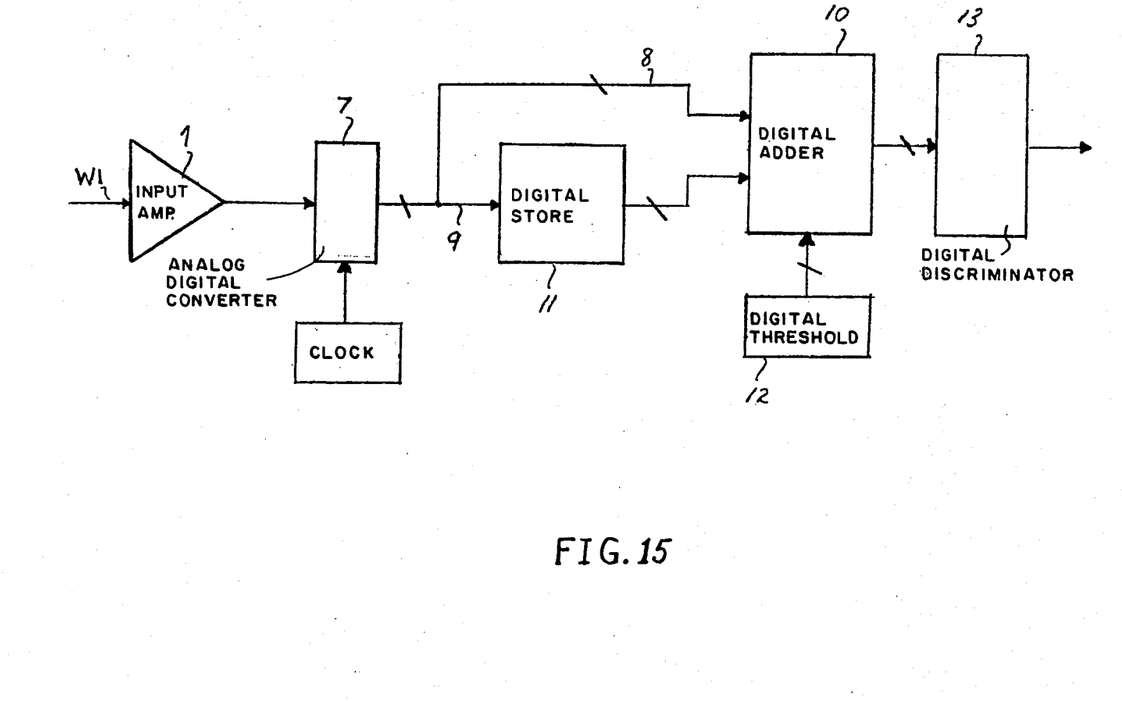

FIG. 15 illustrates a circuit arrangement according to the invention which is digitally operable. This circuit arrangement comprises an analogue-to-digital converter 7 to which the output from amplifier 1 is applied. The digital output from the convertor 7 is applied in parallel over groups of leads 8 and 9 to a digital adder 10 and to a digital (delay) store 11, respectively. The store 11 provides the appropriate "sample" delay and its output is "subtracted" from the real-time data on leads 8 by the adder 10. An element 12 provides a threshold in digital form for the adder 10. The output from the adder 10 is applied to a digital discriminator 13 which provides a binary "1" output when the adder output is $\geq = 1$ and a binary "0" output when it is $< 1$.

What we claim is:

1. A circuit arrangement for detecting changes in amplitude of a video signal, said circuit arrangement comprising input means for receiving the video signal in real time, sampling means for producing at least one sample of the received video signal in each picture element period of the video signal, hold and delay means for delaying each sample for a duration of from one to two picture element periods, comparison means for comparing the amplitude of each delayed sample with the amplitude of the real time video signal to produce a resultant sample having a parameter indicative of the difference of said amplitudes and threshold means responsive to the resultant sample to produce an output signifying a detected change in amplitude of the video signal when said parameter exceeds a threshold value.

2. A circuit arrangement as claimed in claim 1, wherein said parameter is the sample amplitude.

3. A circuit arrangement as claimed in claim 1, wherein said parameter is a digital number representative of the sample amplitude.

4. A circuit arrangement as claimed in claim 1, wherein said sampling and hold means together comprise at least two serially coupled sample and hold circuits.

5. A circuit arrangement as claimed in claim 1, wherein said delay means comprises a digital store.

6. A circuit arrangement as claimed in claim 1, wherein said sampling means produces more than one delayed sample in a picture element period of the video signal.

* * * * *